United States Patent
Ul-haq et al.

(10) Patent No.: US 11,384,176 B2
(45) Date of Patent: Jul. 12, 2022

(54) METHOD OF PRODUCING ACRYLOYL MONOMERS AND ACRYLOYL-BASED POLYMERS

(71) Applicant: Saudi Arabian Oil Company, Dhahran (SA)

(72) Inventors: Imran Ul-haq, Dhahran (SA); Abdullah Al-Malki, Dammam (SA); Manal Al-Eid, Dhahran (SA); Donya A. Alsewdan, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 196 days.

(21) Appl. No.: 16/913,164

(22) Filed: Jun. 26, 2020

(65) Prior Publication Data

US 2021/0403617 A1    Dec. 30, 2021

(51) Int. Cl.
*C08F 20/06* (2006.01)
*C08F 8/32* (2006.01)
(Continued)

(52) U.S. Cl.
CPC .............. *C08F 20/06* (2013.01); *C08F 8/32* (2013.01); *C08F 265/02* (2013.01); *C08K 5/29* (2013.01); *C08K 5/3415* (2013.01); *C08K 5/3435* (2013.01)

(58) Field of Classification Search
USPC ........................................ 525/332.9; 526/75
See application file for complete search history.

(56) References Cited

U.S. PATENT DOCUMENTS 6,051,670 A * 4/2000 Ahmed ................ C09K 8/588
                                                     526/263
9,382,193 B2    7/2016 Liebeskind et al.
(Continued)

FOREIGN PATENT DOCUMENTS

CN    105315232 A    2/2016
EP       828778 A1    3/1998
(Continued)

OTHER PUBLICATIONS

International Search Report and Written Opinion dated Mar. 22, 2021 pertaining to International application No. PCT/US2020/056584 filed Oct. 21, 2020, 15 pgs.
(Continued)

*Primary Examiner* — Fred M Teskin
(74) *Attorney, Agent, or Firm* — Dinsmore & Shohl LLP

(57) ABSTRACT

Embodiments of the present disclosure are directed to a method of making a reaction inhibiting polymer having a formula of M—CO—NR. The method may comprise reacting PAA with an organic coupling reagent and at least one alicyclic amine to produce the reaction inhibiting polymer. In accordance with another embodiment of the present disclosure, a method of making an acryloyl monomer having a formula of $R_a$—CO—NR may comprise reacting an
(Continued)

acrylic acid with an organic coupling reagent and an alicyclic amine to form the acryloyl monomer. $R_a$ may be an alkylene moiety, M may be a poly(acrylic) acid backbone. NR may be an alicyclic amine moiety coupled to the polymer backbone or coupled to the alkylene moiety.

12 Claims, 5 Drawing Sheets

(51) Int. Cl.
    *C08F 265/02*     (2006.01)
    *C08K 5/3415*     (2006.01)
    *C08K 5/3435*     (2006.01)
    *C08K 5/29*     (2006.01)

(56) References Cited

U.S. PATENT DOCUMENTS

| | | | |
|---|---|---|---|
| 9,914,790 B2* | 3/2018 | Wang | C09K 8/528 |
| 10,189,986 B2 | 1/2019 | Elanany et al. | |
| 10,550,215 B2 | 2/2020 | Elanany et al. | |
| 2017/0321108 A1* | 11/2017 | Majnouni | C09K 8/52 |
| 2020/0115484 A1 | 4/2020 | Elanany et al. | |
| 2020/0148828 A1 | 5/2020 | Elanany et al. | |

FOREIGN PATENT DOCUMENTS

| | | |
|---|---|---|
| WO | 9638492 A1 | 12/1996 |
| WO | 0062630 | 10/2000 |

OTHER PUBLICATIONS

Zhang, Q. et al., "A Simple and Direct Route to High-Performance Acrylamido-Based Kinetic Gas Hydrate Inhibitors from Poly(acrylic acid)", Energy & Fuels, vol. 34, No. 5, Apr. 20, 2020, pp. 6279-6287.

Zhou, X. et al. "A Facile Synthesis of Poly(acrylanilide-co-acrylic Acid)", Asian Journal of Chemistry, vol. 25, No. 6, Jan. 1, 2013, pp. 3247-3251.

Office Action dated Sep. 30, 2020 pertaining to European Patent Application No. 17723838.3.

Office Action dated Jan. 10, 2020 pertaining to GOG Patent Application No. 2017/33342.

Pangon et al. "Poly(acrylic acid) containing multi-benzimidazole units: A simple approach to obtain polymer with proton donor-acceptor system" Polymer 53 (2012) 3878-3884, 7 pgs.

Somers et al. "Energy transfer of CdSe/ZnS nanocrystals encapsulated with rhodamine-dye functionalized poly acrylic acid)" Journal of Photochemistry and Photobiology A: Chemistry 248 (2012) 24-29, 6 pgs.

Tiwari et al. "Enhanced drug release by selective cleavage of cross-links in a double-cross-linked hydrogel" RSC Adv., 2016, 6, 102453-102461, 9 pgs.

\* cited by examiner

METHOD OF PRODUCING ACRYLOYL MONOMERS AND ACRYLOYL-BASED POLYMERS

TECHNICAL FIELD

The present disclosure relates to the production of polymers and more specifically, to the production of acryloyl polymers.

BACKGROUND

Natural gas hydrates are crystalline materials which comprise water molecules enclathrating natural gas guest molecules. The formation of gas hydrates in gas lines poses serious safety and economic concerns as hydrates can plug pipelines, damage equipment, and have negative effects on downstream facilities. In gas production, prevention of the formation of gas hydrates is required to avoid decreased production capacity and shutdowns. Kinetic hydrate inhibitors are polymeric materials, used in low concentrations to prevent the formation of gas hydrates. The low concentrations required when using kinetic hydrate inhibitors, relative to other gas hydrate inhibitors, results in attractive cost, toxicity, and environmental impact parameters.

Several polymer products are used as kinetic hydrate inhibitors (KHIs) around the world. These polymer based KHIs can efficiently inhibit hydrate formation during the production, transportation, and processing of natural gas containing $H_2S$ and $CO_2$. Important polymer based KHIs are produced from acryloyl based monomers with cyclic substituents.

The conventional methods of producing acryloyl based polymers with cyclic substituents require multiple reaction steps and monomers produced from reactive and toxic acryloyl chlorides. The conventional methods require polymer reactors and harsh reaction temperatures to produce the final polymer. The cost and operational difficulties of conventionally produced monomers limit the commercialization of these polymer based KHIs.

SUMMARY

The reaction inhibiting polymer of formula M—CO—NR may be particularly suitable for use as a kinetic gas hydrate inhibitor (KHI). Even relatively small amounts of KHI can slow the formation of gas hydrates in flows of hydrocarbons and water. Gas hydrates are crystalline solids which can entrap hydrocarbon gasses. The formation of gas hydrates in hydrocarbon flows, such as pipelines, can cause blockages and equipment damage.

Accordingly, it is desired to produce kinetic reaction inhibitors in a single step and without the production of acryloyl chlorides. Embodiments of the present disclosure meet this need by providing methods of producing a kinetic reaction inhibitor comprising reacting poly(acrylic) acid with at least one alicyclic amine and an organic coupling reagent to produce the reaction inhibiting polymer.

According to the subject matter of the present disclosure, a method of making a reaction inhibiting polymer having a formula of M—CO—NR may comprise reacting poly(acrylic) acid (PAA) with an organic coupling reagent and at least one alicyclic amine to produce the reaction inhibiting polymer. M may be a poly(acrylic) acid backbone and NR may be an alicyclic amine moiety coupled to the polymer backbone.

In accordance with another embodiment of the present disclosure, a method of making an acryloyl monomer having a formula of $R_a$—CO—NR may comprise reacting an acrylic acid with an organic coupling reagent and an alicyclic amine to form the acryloyl monomer. $R_a$ may be an alkylene moiety and NR may be an alicyclic amine moiety.

Although the concepts of the present disclosure are described herein with primary reference to kinetic gas hydrate inhibitor synthesis, it is contemplated that the concepts will enjoy applicability to any polymer synthesis.

BRIEF DESCRIPTION OF THE DRAWINGS

The following detailed description of specific embodiments of the present disclosure can be best understood when read in conjunction with the following drawings.

ABBREVIATIONS

° C.=degrees Celsius.
CDI=1,1'-carbonyldiimidazole
DCC=dicyclohexyl carbodiimide.
DIC=3-diiscaropropylcarbodiimide.
EDC=1-ethyl-3-(3-dimethylaminopropyl) carbodiimide.
$^1$H-NMR=hydrogen nuclear magnetic resonance or proton nuclear magnetic resonance.
KHI=kinetic gas hydrate inhibitor.
PAA=poly(acrylic) acid.

DETAILED DESCRIPTION

Acryloyl polymers and monomers are used in the production of kinetic reaction inhibitors, such as kinetic gas hydrate inhibitors (KHI) and kinetic corrosion inhibitors. The production of acryloyl polymers traditionally required the use of acryloyl chloride monomers as an intermediate product. However, since acryloyl chloride monomers are unstable and highly toxic, avoiding their use is desirable.

Figure 1:
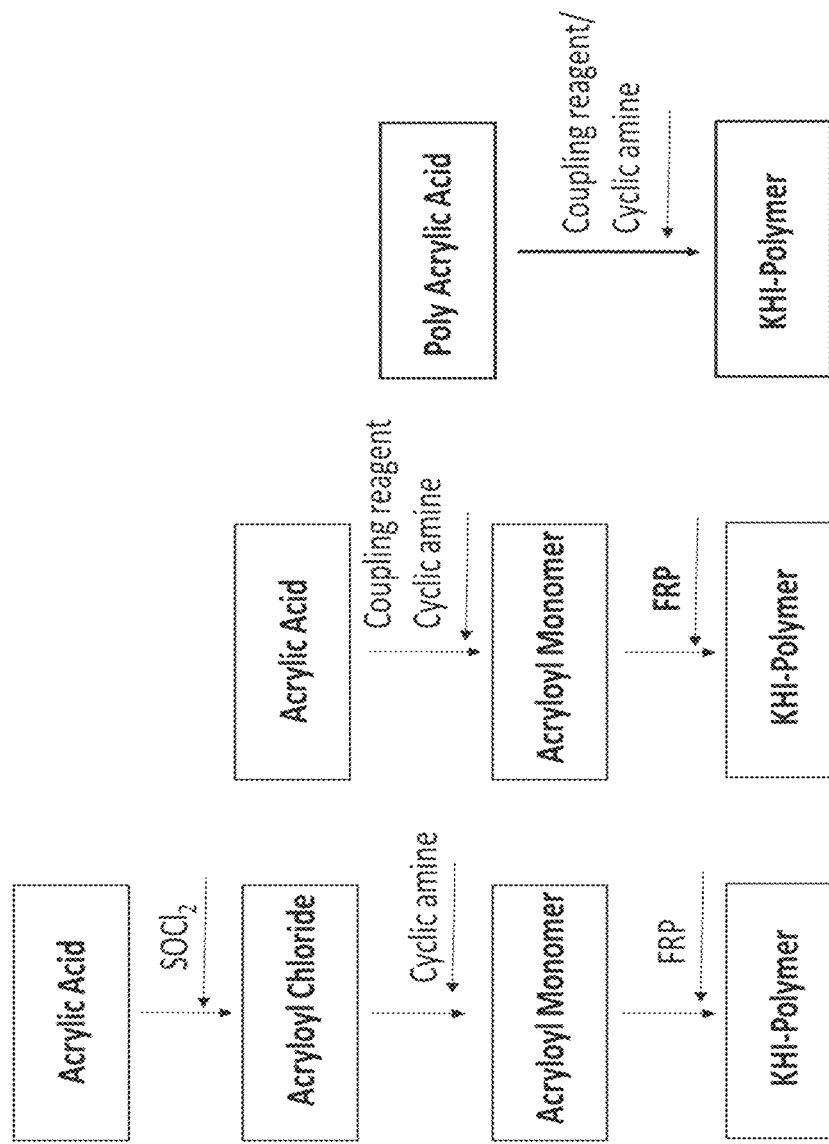
FIG. 1 is a flowchart describing both conventional and inventive methods of producing acryloyl monomers and acryloyl-based polymers.

As is shown in FIG. 1, the present methods of producing acryloyl monomers and polymers require fewer steps than the conventional method. The present methods also avoid the use of acryloyl chloride monomers. The present methods further disclose a single-step process for producing the KHI polymer from poly(acrylic) acid (PAA).

The subject matter of the present disclosure is directed to methods of making acryloyl monomers and polymers without the use of chloride-based intermediates. In one embodiment, a method of making a reaction inhibiting polymer having a formula of M—CO—NR may comprise reacting PAA with an organic coupling reagent and at least one alicyclic amine to produce the reaction inhibiting polymer. M may be the poly(acrylic) acid polymer backbone and NR may be an alicyclic amine moiety coupled to the polymer backbone.

A molar ratio of organic coupling reagent (OCR) to the poly(acrylic) acid (PAA) may be from 5:100 to 150:100. For example, the molar ratio of OCR to PAA may be from 5:100 to 125:100, from 5:100 to 100:100, from 25:100 to 150:100, from 25:100 to 125:100, from 25:100 to 100:100, from 50:100 to 150:100, from 50:100 to 125:100, from 75:100 to 150:100, from 75:100 to 125:100, or any subset thereof.

A molar ratio of the at least one alicyclic amine to the poly(acrylic) acid (PAA) may be from 5:100 to 150:100. For example, the molar ratio of alicyclic amine to PAA may be from 5:100 to 125:100, from 5:100 to 100:100, from 25:100 to 150:100, from 25:100 to 125:100, from 25:100 to 100:100, from 50:100 to 150:100, from 50:100 to 125:100, from 75:100 to 150:100, from 75:100 to 125:100, or any subset thereof.

A molar ratio of the at least one alicyclic amine to the OCR may be from 8:10 to 12:10. For example, the molar ratio of the alicyclic amine to the OCR may be from 8:10 to 11:10, 9:10 to 12:10, or 9:10 to 11:10, or any subset thereof. According to some embodiments, the molar ratio of alicyclic amine to the OCR may be about 1:1. Without being limited by theory, it is believed that an equimolar ratio of alicyclic amine to OCR may result in complete attachment of the alicyclic amine to the polymer backbone or the acrylic acid.

As used herein, an "alicyclic amine" may refer to an aliphatic compound having a carbocyclic ring structure, which may be saturated or unsaturated but may not be a benzenoid or other aromatic system. The carbocyclic ring structure may comprise at least one nitrogen atom.

As used herein, an "acrylic acid" may refer to an organic compound with the formula $CH_2=CHCOOH$. As used herein, a "poly(acrylic) acid" may refer to a polymer of acrylic acid.

The PAA may comprise a homopolymer of acrylic acid. The PAA may also comprise a copolymer of acrylic acid, such as an alternating copolymer, a random copolymer, a periodic copolymer, a statistical copolymer, or a block copolymer.

As used herein, a "homopolymer" may refer to a polymer formed from a single type of monomer. As used herein, a "copolymer" may refer to a polymer derived from more than one species of monomer. As used herein, an "alternating copolymer" may refer to a copolymer comprising two species of monomeric units distributed in an alternating sequence. As used herein, a "random copolymer" may refer to a copolymer comprising two species of monomeric units distributed in a random sequence. As used herein, a "periodic copolymer" may refer to a copolymer comprising three or more species of monomeric units arranged in a repeating pattern. As used herein, a "statistical copolymer" may refer to a copolymer comprising two or more monomeric units with a distribution which follows a statistical rule. As used herein, a "block copolymer" may refer to a copolymer comprising two or more monomeric units and where the monomeric units cluster with similar monomeric units. For example, a block copolymer may have a structure of the form AAAABBBBAAAA.

The reaction inhibiting polymer of formula M—CO—NR may comprise the structure of formula (I), wherein n is the number of repeating acrylic acid units in the poly(acrylic) acid polymer backbone. The alicyclic amine moiety NR is coupled to the polymer backbone. As used herein, "coupled" means the NR alicyclic amine moiety is grafted onto at least one of the repeating acrylic acid units.

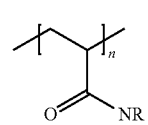

(I)

The reaction inhibiting polymer may comprise from 1 wt. % to 50 wt. % of the alicyclic amine moiety. For example, the reaction inhibiting polymer may comprise from 1 wt. % to 40 wt. %, 1 wt. % to 30 wt. %, 1 wt. % to 20 wt. %, 1 wt. % to 10 wt. %, 5 wt. % to 50 wt. %, 5 wt. % to 40 wt. %, 5 wt. % to 30 wt. %, 5 wt. % to 20 wt. %, 5 wt. % to 10 wt. %, 10 wt. % to 50 wt. %, 10 wt. % to 40 wt. %, 20 wt. % to 50 wt. %, 20 wt. % to 40 wt. %, 30 wt. % to 50 wt. %, or 30 wt. % to 40 wt. %, or any subset thereof, of the alicyclic amine moiety.

Like the PAA, the reaction inhibiting polymer may be an alternating copolymer, a random copolymer, a periodic copolymer, a statistical copolymer, or a block copolymer.

The alicyclic amine designated as NR may comprise a ring structure, wherein at least one nitrogen atom forms a link in the ring structure. A nitrogen in the ring structure of the alicyclic amine may have non-aromatic character. Without being limited by theory, it is believed that if the nitrogen in the ring is aromatic, the nitrogen atom will be unable to participate in the coupling reaction.

The ring structure of the alicyclic amine may comprise from 5 atoms to 8 atoms, at least one of which is nitrogen and at least one of which is carbon. For example, the ring structure may comprise from 5 atoms to 6 atoms, from 5 atoms to 7 atoms, from 5 atoms to 8 atoms, from 6 atoms to 7 atoms, from 6 atoms to 8 atoms, or from 7 atoms to 8 atoms, or any subset thereof.

According to some embodiments, all members of the ring may be carbon, except for single nitrogen. Alternatively, at least two of the atoms in the ring structure may be nitrogen. According to further embodiments, the ring structure of the alicyclic amine may comprise one or both of an oxygen atom or a sulfur atom. The ring structure of the alicyclic amine may comprise C and N; or C, N, and O; or C, N, and S; or C, N, O, and S; or any subset thereof.

One or more of the carbon atoms in the ring structure may be bonded to an atom outside the ring. For example, one of the carbon atoms in the ring may be bonded to an oxygen or a carbon which does not form a part of the ring itself. It should be understood that these atoms outside the ring are not to be counted towards the number of atoms which comprise the ring structure.

An organic coupling reagent may include any organic compound capable of converting carboxylic acids to esters. For example, the organic coupling reagent may be a carbodiimide. The carbodiimide may be one or more of 1-ethyl-3-(3-dimethylaminopropyl) carbodiimide (EDC), dicyclohexyl carbodiimide (DCC), and 3-diiscaropropylcarbodiimide (DIC). The organic coupling reagent may be 1,1'-carbonyldiimidazole (CDI).

The alicyclic amine may comprise any non-aromatic ring with at least one nitrogen atom. For example, the alicyclic amine may comprise one or more of pyrrolidine, piperidine, piperazine, morpholine, thiazolidine, azepane, pyrrolidone, 3-isobutyl pyrrolidine, 3-pyrrolidone, piperidone, 2-piperidone, 3-piperidone, 4-piperidone, 4-isopropyl piperidine, and caprolactam.

The reaction may take place at a temperature between 0° C. and 35° C. For example, the reaction may occur at a temperature between 0° C. and 30° C., 0° C. and 20° C., 0° C. and 10° C., 0° C. and 5° C., 5° C. and 35° C., 5° C. and 20° C., 5° C. and 15° C., 10° C. and 35° C., 10° C., and 20° C., or any subset thereof.

The reaction may take place for from 0.1 hour to 24 hours. For example, the reaction may take place for from 0.1 hours to 20 hours, from 0.1 hours to 15 hours, from 0.1 hours to 10 hours, from 0.1 hours to 5 hours, from 0.1 hours to 1 hour, from 1 hour to 24 hours, from 1 hour to 20 hours, from 1 hour to 15 hours, from 1 hour to 10 hours, from 1 hour to 5 hours, or any subset thereof.

The reaction may take place in the presence of a solvent. The solvent may be aqueous or non-aqueous. According to some embodiments, the solvent may be dimethylformamide (DMF).

The reaction mixture may be stirred. For example, the stirring may occur using a stirring plate and a magnetic stirrer bar. Dichloromethane (DCM) and water may be added to the reaction mixture. The DCM layer may be separated to remove any unreacted organic compounds. The aqueous layer may be dialyzed using a cellulose membrane with a molecular weight cutoff (MWCO) of 1000, to remove any residual DMF. The dialyzed material may be freeze-dried to collect the final material. The final material may be present as a white powder.

According to some embodiments, chloride may be present during the reaction. In such embodiments, the molar ratio of chloride to alicyclic amine may be from 0:10 to 1:10. For example, the molar ratio of chloride to alicyclic amine may be from 0:10 to 0.1:10, or from 0:10 to 0.01:10, or from 0:10 to 0.001:10, or even from 0:10 to 0.0001:10. Optionally, substantially no chloride may be present during the reaction.

In additional embodiments, a method of making an acryloyl monomer having a formula of $R_a$—CO—NR may comprise reacting an acrylic acid with an organic coupling reagent and an alicyclic amine to form the acryloyl monomer. $R_a$ may be an alkylene moiety and NR may be an alicyclic amine moiety.

The acryloyl monomer having formula $R_a$—CO—NR may be given by formula (II).

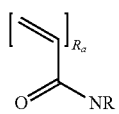

(II)

As used herein, an alkylene moiety may comprise acyclic, branched or unbranched hydrocarbons having at least one carbon-carbon double bond and the general formula $C_nH_{2n}$.

A molar ratio of organic coupling reagent to the alkylene moiety may be from 1:100 to 110:100. For example the ratio of the organic coupling reagent to the alkylene moiety may be from 1:100 to 100:100, from 1:100 to 90:100, from 1:100 to 65:100, from 1:100 to 40:100, from 10:100 to 110:100, from 10:100 to 90:100, from 10:100 to 65:100, from 10:100 to 40:100, from 25:100 to 110:100, from 25:100 to 80:100, from 50:100 to 110:100, from 50:100 to 80:100, from 90:100 to 110:100, or any subset thereof.

A molar ratio of at least one alicyclic amine moiety to the alkylene moiety may be from 1:100 to 110:1000. For example, the molar ratio of the at least one alicyclic amine moiety to the alkylene moiety may be from 1:100 to 100:100, from 1:100 to 90:100, from 1:100 to 65:100, from 1:100 to 40:100, from 10:100 to 110:100, from 10:100 to 90:100, from 10:100 to 65:100, from 10:100 to 40:100, from 25:100 to 110:100, from 25:100 to 80:100, from 50:100 to 110:100, from 50:100 to 80:100, from 90:100 to 110:100, or any subset thereof.

The acryloyl monomer having a formula of $R_a$—CO—NR may be converted to a polymer form using a free radical polymerization (FRP) process. A method of making a reaction inhibiting polymer having a formula of M—CO—NR may comprise subjecting the acryloyl monomer of formula $R_a$—CO—NR to a free radical polymerization process, wherein M may be a poly(acrylic) acid polymer backbone, and NR may be alicyclic amine moiety.

The reaction may take place at a temperature between 0° C. and 20° C. For example, the reaction may occur at a temperature between 0° C. and 15° C., 0° C. and 10° C., 0° C. and 5° C., 5° C. and 20° C., 5° C. and 15° C., 10° C., and 20° C., or any subset thereof. Without being limited by theory, it is believed that above 20° C. the monomer may begin to polymerize in an undesired manner.

The reaction may take place for from 0.1 hour to 15 hours. For example, the reaction may take place for from 0.1 hours to 10 hours, from 0.1 hours to 5 hours, from 0.1 hours to 1 hour, from 1 hour to 15 hours, from 1 hour to 10 hours, from 1 hour to 5 hours, or any subset thereof.

As used herein, FRP may refer to a method of forming a polymer through the successive addition of free-radical building blocks. Free radicals can be initiated through the use of separate initiator molecules. Free radical initiators may include organic peroxides; azo compounds; redox initiators, such as $Fe^{2+}$, $Cr^{2+}$, $V^{2+}$, $Ti^{3+}$, $Co^{2+}$, and $Cu^+$; persulfates; ionizing radiation; direct electrochemical initiation; mediated electrochemical initiation; sonication; or ternary initiators.

Subjecting the acryloyl monomer to a FRP process may include reacting the acryloyl monomer of formula $R_a$—CO—NR with a free-radical initiator to form a polymer comprising elements with the formula M—CO—NR.

Subjecting the acryloyl monomer to a FRP process may include reacting the acryloyl monomer of formula $R_a$—CO—NR with a free-radical initiator in the presence of a chain transfer agent. For example, a chain transfer agent may include merceptocarboxylic acid or merceptoethanol. The chain transfer agent may be used to control the molecular weight of the formed polymer.

Subjecting the acryloyl monomer to a FRP process may involve combining the monomer, initiator, and chain transfer agent. The components may be combined in a three-neck round bottom flask connected to a reflux condenser. Water may be added to the reaction mixture as a solvent. The reaction mixture may be heated at about 63° C., under $N_2$, for about 4 hours. After about 4 hours, the reaction mixture may be cooled to about 5° C. The cooled reaction mixture may be washed with diethyl ether and freeze-dried to obtain the final polymer as powder.

A method of using the reaction inhibiting polymer of formula M—CO—NR may comprise contacting the reaction inhibiting polymer with a flow of hydrocarbons and water. The hydrocarbons may include natural gas, methane, ethane, propane, butane, and heavier hydrocarbons.

The reaction inhibiting polymer may contact the flow of hydrocarbons and water in a pipeline, shut-in oil well, shut-in gas well, pump, valve, or reactor.

The weight ratio of reaction inhibiting polymer to the combined weight of hydrocarbons and water may be from 1:1000 to 100:1000. For example, the weight ratio may be from 1:1000 to 75:1000, or from 1:1000 to 50:1000, or from 1:1000 to 25:1000, or from 25:1000 to 100:1000, or from 50:1000 to 100:1000, or from 25:1000 to 75:1000, or any subset thereof.

The reaction inhibiting polymer may contact the flow of hydrocarbons and water at a temperature of 4° C. to 40° C. For example, the temperature may be from 4° C. to 30° C., from 4° C. to 20° C., from 10° C. to 40° C., from 10° C. to 30° C., from 10° C. to 20° C., from 20° C. to 40° C., from 20° C. to 30° C., or any subset thereof.

The reaction inhibiting polymer may contact the flow of hydrocarbons and water at a pressure of 1 bar to 250 bar. For example, the pressure may be from 1 bar to 200 bar, from 1 bar to 150 bar, from 1 bar to 100 bar, from 1 bar to 50 bar, from 25 bar to 250 bar, from 25 bar to 200 bar, from 25 bar to 150 bar, from 25 bar to 100 bar, from 25 bar to 50 bar, from 50 bar to 250 bar, from 50 bar to 200 bar, from 100 bar to 250 bar, from 100 bar to 200 bar, or any subset thereof.

The reaction inhibiting polymer may contact the flow of hydrocarbons and water, thereby resulting in an induction time of from 1 hour to 4 days. For example, the induction time may be from 1 hour to 3 days, from 1 hour to 2 days, from 1 hour to 1 day, from 1 hour to 12 hours, from 2 hours to 4 days, from 6 hours to 4 days, from 12 hours to 4 days, from 1 day to 4 days, from 12 hours to 3 days, or any subset thereof. As used herein, induction time may refer to the time between contacting the reaction inhibiting polymer with the flow of hydrocarbons and water, and the time at which a detectable volume of hydrate phase appears.

EXAMPLES

Example 1

Figure 2:
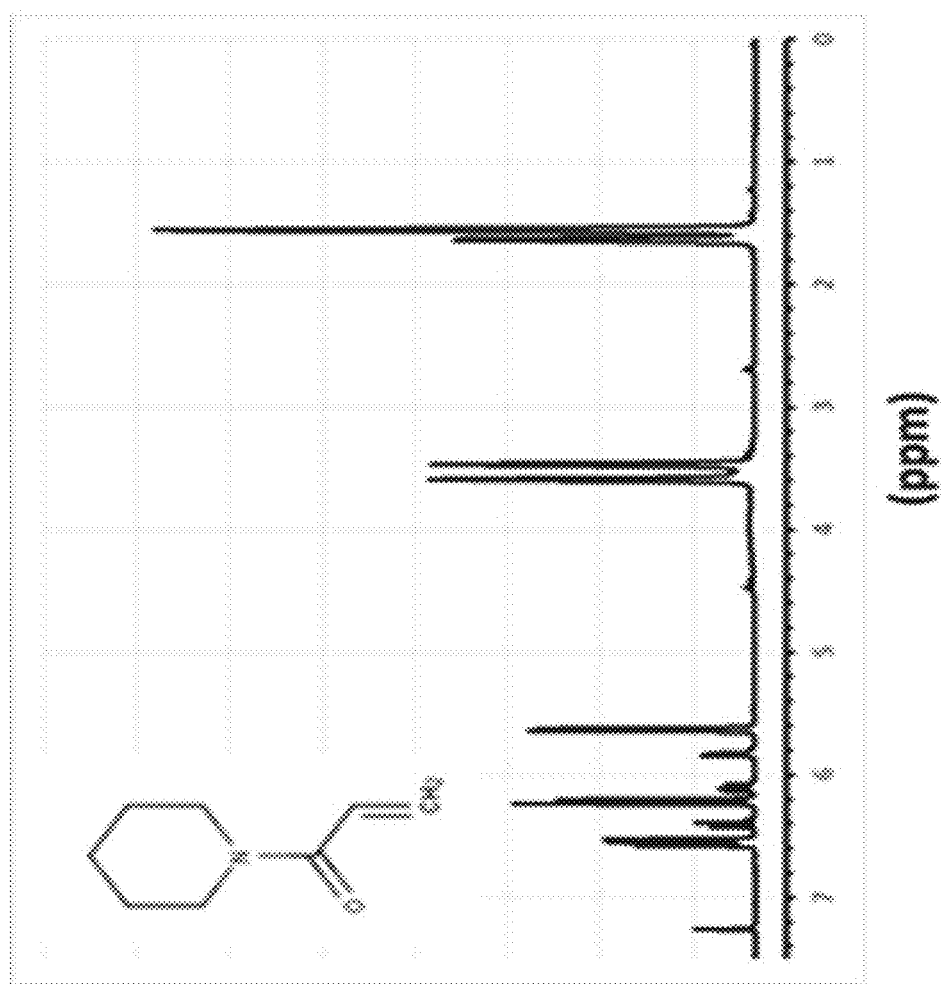
FIG. 2 shows the $^1$H-NMR characterization of the compound formed in Example 1. The inset structure shows the compound formed in Example 1.

An acryloyl monomer of formula (III) was prepared by reacting a five-carbon alicyclic amine (piperidine) with acrylic acid and EDC in water. The ratio of piperidine:acrylic acid was 1:1 and the ratio of organic coupling reagent:acrylic acid was 1:1. The aqueous solution was stirred for 3 hours at a temperature between 0° C. and 10° C., under ambient pressure. The product was analyzed by 41-NMR, the results of which are shown in FIG. 2.

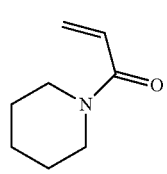

(III)

Example 2

Figure 3:
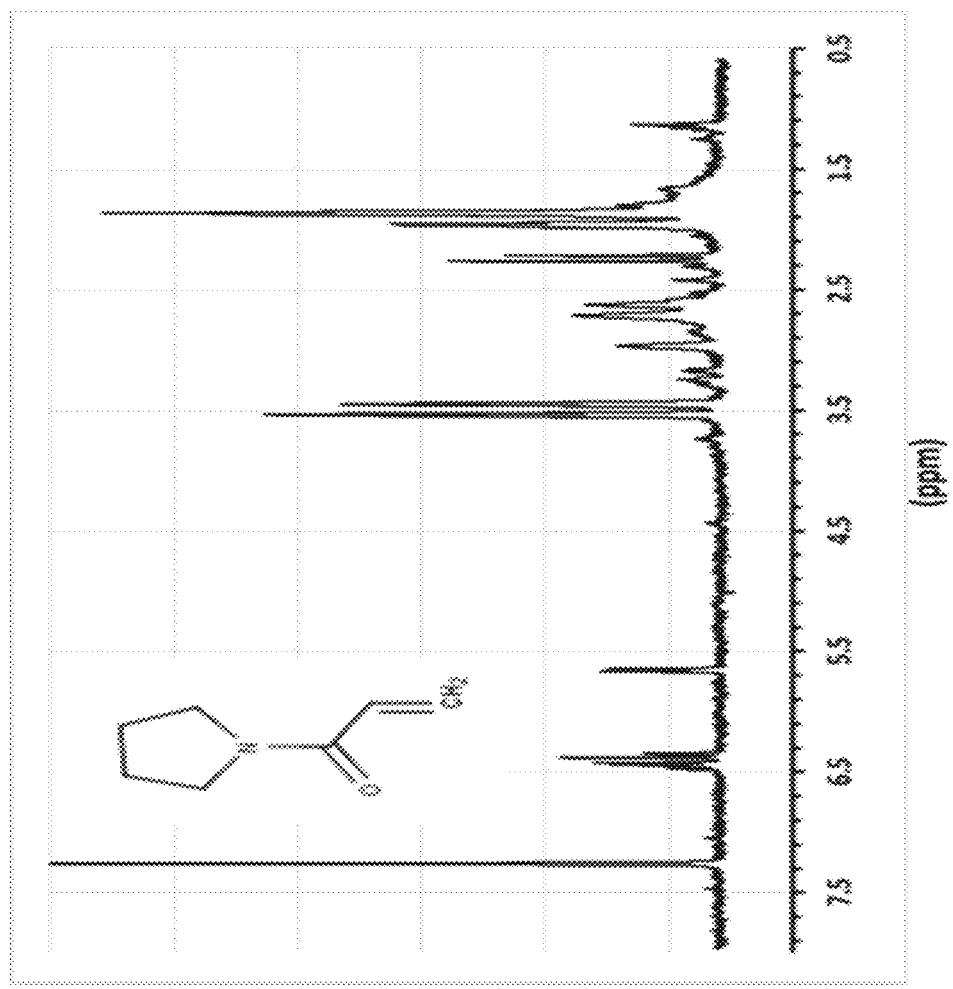
FIG. 3 shows the $^1$H-NMR characterization of the compound formed in Example 2. The inset structure shows the compound formed in Example 2.

An acryloyl monomer of formula (IV) was prepared by reacting a four-carbon alicyclic amine (pyrrolidine) with acrylic acid and EDC in water. The ratio of pyrrolidine:acrylic acid was 1:1 and the ratio of organic coupling reagent:acrylic acid was 1:1. The aqueous solution was stirred for 3 hours at a temperature between 0° C. and 10° C., under ambient pressure. The product was analyzed by 41-NMR, the results of which are shown in FIG. 3.

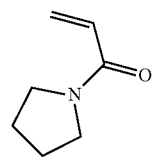

(IV)

Example 3

Figure 4:
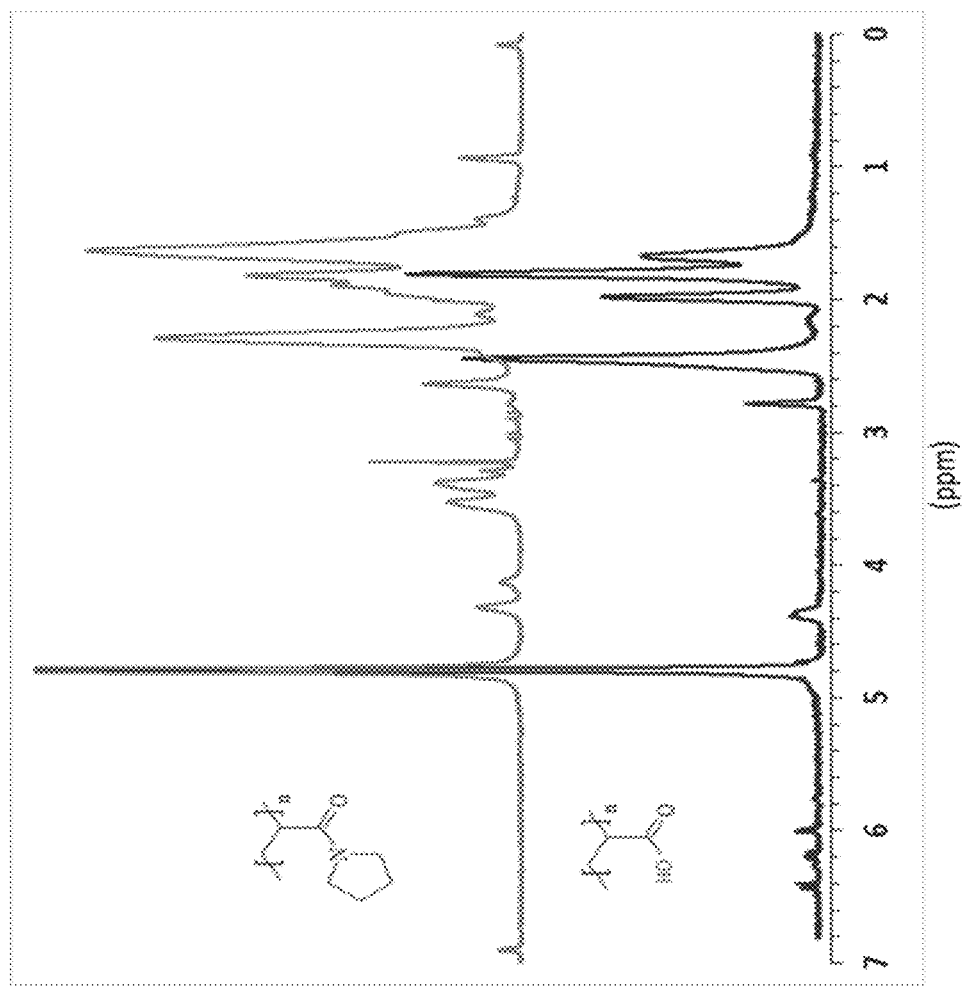
FIG. 4 shows the $^1$H-NMR characterization of the compound formed in Example 3. The upper inset structure and line show the compound formed in Example 3. The lower inset structure and line show the base PAA.

An acryloyl polymer of formula (V) was prepared by reacting a four-carbon alicyclic amine (pyrrolidine) with PAA and EDC in DMF. The ratio of pyrrolidine:PAA was 1:1 and the ratio of organic coupling reagent:PAA was 1:1. The aqueous solution was stirred for 12 hours at a temperature of 25° C., under ambient pressure. The product was analyzed by $^1$H-NMR, the results of which are shown in FIG. 4.

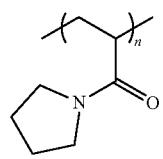

(V)

Example 4

Figure 5:
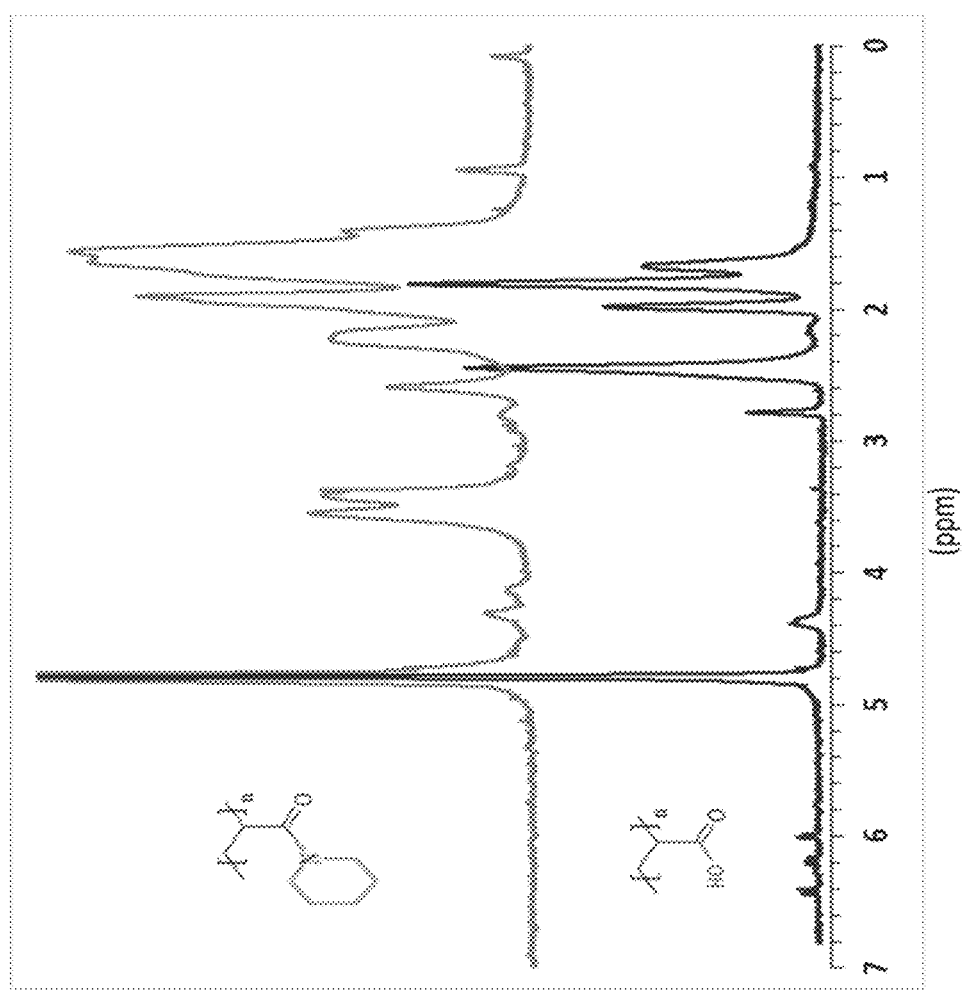
FIG. 5 shows the $^1$H-NMR characterization of the compound formed in Example 4. The upper inset structure and line shows the compound formed in Example 4. The lower inset structure and line show the base PAA.

An acryloyl polymer of formula (VI) was prepared by reacting a five-carbon alicyclic amine (piperidine) with PAA and EDC in DMF. The ratio of piperidine:PAA was 1:1 and the ratio of organic coupling reagent:PAA was 1:1. The aqueous solution was stirred for 12 hours at a temperature of 25° C., under ambient pressure. The product was analyzed by $^1$H-NMR, the results of which are shown in FIG. 5.

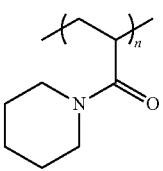

(VI)

The polymer of Example 2 has been shown to inhibit gas hydrate formation resulting in an induction time of 1500 min, at a dosage of 3 wt. %, a pressure of 140 bar, and a temperature of 14.6° C., with a sub-cooling temperature of 4.0° C. (18.6° C. to 14.6° C.) for SI type gas hydrate in the presence of $H_2S$ (2.3 mole percent) with SI type gas hydrate forming gases. As used herein, sub-cooling is defined as the difference between the hydrate stability temperature and the actual operating temperature at the same pressure.

It is also noted that recitations herein of "at least one" component, element, etc., should not be used to create an inference that the alternative use of the articles "a" or "an" should be limited to a single component, element, etc.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of making a reaction inhibiting polymer having a formula of M—CO—NR, the method comprising reacting poly(acrylic) acid with an organic coupling reagent and at least one alicyclic amine to produce the reaction inhibiting polymer; wherein
   M is the poly(acrylic) acid polymer backbone,
   NR is an alicyclic amine moiety coupled to the polymer backbone,
   the alicyclic amine comprises a ring structure,
   the ring structure comprises from 5 to 8 atoms, at least one of which is nitrogen and the remainder of which are carbon, and
   the organic coupling reagent is a carbodiimide.

2. The method of making a reaction inhibiting polymer of claim 1, wherein one or more of the carbon atoms which make up the ring structure of the alicyclic amine is bonded to one or more oxygen or carbon atoms outside the ring.

3. The method of making a reaction inhibiting polymer of claim 1, wherein the organic coupling reagent is one or more of 1-ethyl-3-(3-dimethylaminopropyl) carbodiimide (EDC), dicyclohexyl carbodiimide (DCC), and 3-diiscaropropylcarbodiimide (DIC).

4. The method of claim 1, wherein the alicyclic amine comprises one or more of pyrrolidine, piperidine, piperazine, morpholine, thiazolidine, azepane, pyrrolidone, 3-isobutyl pyrrolidine, 3-pyrrolidone, piperidone, 2- piperidone, 3- piperidone, 4- piperidone, 4-isopropyl piperidine, and caprolactam.

5. The method of claim 1, wherein the reacting occurs at a temperature between 0° C. and 25° C.

6. A method of making an acryloyl monomer having a formula of $R_a$—CO— NR, the method comprising reacting an acrylic acid with an organic coupling reagent and an alicyclic amine to form the acryloyl monomer; wherein $R_a$ is an alkylene moiety, NR is an alicyclic amine moiety coupled to the alkylene moiety, and the organic coupling reagent is a carbodiimide.

7. A method of making a reaction inhibiting polymer having a formula of M—CO—NR, the method comprising subjecting the acryloyl monomer obtained by the method of claim 6 to a free radical polymerization process, wherein M comprises a poly(acrylic) acid polymer backbone.

8. The method of claim 6 wherein the organic coupling reagent is one or more of 1-ethyl-3-(3-dimethylaminopropyl) carbodiimide (EDC), dicyclohexyl carbodiimide (DCC), and 3-diiscaropropylcarbodiimide (DIC).

9. The method of claim 6, wherein the alicyclic amine comprises a ring structure, wherein the ring structure comprises from 5 to 8 atoms, at least one of which is nitrogen.

10. The method of claim 9, wherein the remainder of the atoms in the ring structure are carbon.

11. The method of claim 6, wherein the alicyclic amine comprises one or more of pyrrolidine, piperidine, piperazine, morpholine, thiazolidine, azepane, pyrrolidone, 3-isobutyl pyrrolidine, 3-pyrrolidone, piperidone, 2-piperidone, 3-piperidone, 4-piperidone, 4-isopropyl piperidine, and caprolactam.

12. A method of making and using a reaction inhibiting polymer having a formula of M—CO—NR, the method comprising:
   reacting poly(acrylic) acid with an organic coupling reagent and at least one alicyclic amine to produce the reaction inhibiting polymer; and
   contacting the reaction inhibiting polymer with a flow of hydrocarbons and water, wherein
   M is the poly(acrylic) acid polymer backbone,
   NR is an alicyclic amine moiety coupled to the polymer backbone,
   the alicyclic amine comprises a ring structure,
   the ring structure comprises from 5 to 8 atoms, at least one of which is nitrogen and the remainder of which are carbon, and
   the organic coupling reagent is a carbodiimide
   the weight ratio of reaction inhibiting polymer to the combined weight of hydrocarbons and water is from 1:1000 to 100:1000.

* * * * *